Patented Nov. 23, 1948

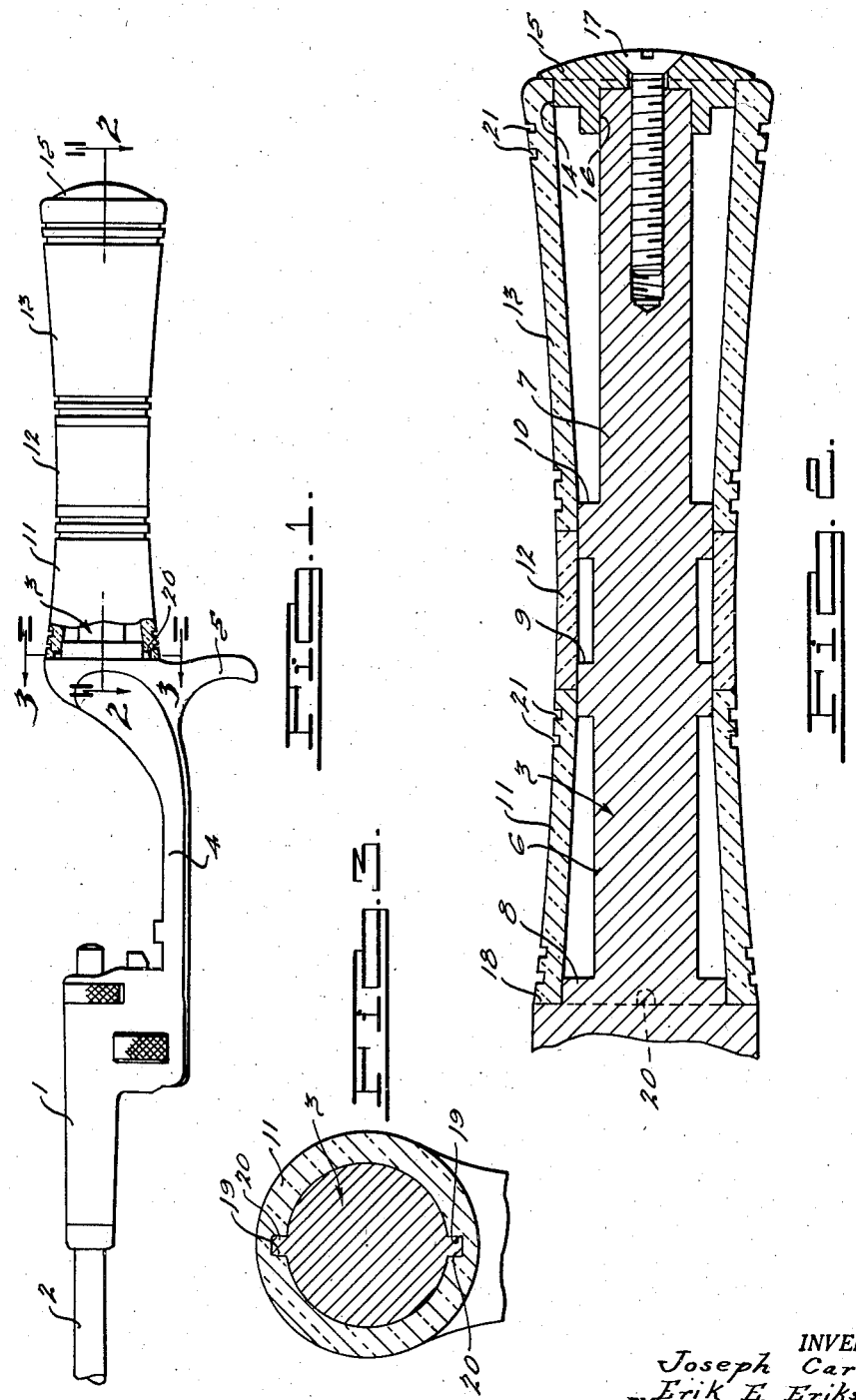

2,454,529

UNITED STATES PATENT OFFICE 2,454,529

REAR GRIP FOR FISHING ROD HANDLES

Richard A. Thompson and Erik E. Eriksson, Detroit, and Joseph Carlson, Grosse Pointe Farms, Mich.; said Eriksson and said Thompson assignors to Orchard Industries, Inc., Detroit, Mich., a corporation of Michigan; said Joseph Carlson assignor, by decree of court, to Marie E. H. W. Carlson Application October 17, 1946, Serial No. 703,846

1 Claim. (Cl. 43—23)

The present invention relates to a fishing rod handle and particularly to an improved rear grip construction for such a handle.

It is the general object of the present invention to provide an improved rear grip construction for a fishing rod handle characterized by its high strength, light weight, low cost and attractive appearance.

Other objects and advantages of the present invention will become apparent from the following specification, the drawings relating thereto and the claim hereinafter set forth.

In the drawings:

Figure 1 is a side elevation of one form of fishing rod handle embodying the rear grip of the present invention;

Figure 2 is a longitudinal section through the handle taken on the line 2—2 of Figure 1; and Figure 3 is a transverse section taken on the line 3—3 of Figure 1.

As best shown in Figure 1, the handle comprises a main body which is formed of a suitable material, preferably metal, by casting or otherwise, into a rod socket portion 1 adapted to receive the rear end of a fishing rod, indicated fragmentarily at 2, a rear shank 3 and an intermediate reel seat portion 4. The body is also provided with the usual trigger grip 5. The mechanism for securing the fishing rod within the socket portion 1 and securing the reel to the reel seat portion 4 forms no part of the present invention and, consequently, is not further illustrated or described. Any suitable mechanism for these purposes may be employed.

The principal features of the present invention relate to the construction of the rear grip associated with the shank 3. In this connection, it should be noted that the rear grip on a fishing rod must be of great strength in order to resist the strains placed upon it in use and must be of substantial diameter in order to afford a satisfactory hand grip. However, it is highly desirable that its weight be as little as possible in order to reduce fatigue. It is also essential that the grip be covered by a nonmetallic material, such as cork, rubber or a plastic composition.

The above stated requirements are to a high degree conflicting since, if the diameter of the central metal shank of the grip is reduced to the maximum possible extent consistent with the strength requirements in order to reduce weight, then an unduly large thickness of nonmetallic sheathing must be employed to produce a handle of the requisite diameter. This requires the use of an excessive quantity of nonmetallic material, with the resulting increase in cost, and also results in an outer sheath of variable thickness, which, in the case of plastic compositions, complicates the molding operation.

In accordance with the present invention, the above difficulties are overcome by providing a shank which is of relatively small diameter and which tapers in diameter toward its rear end in order to provide the minimum weight of material for the required strength. A tubular nonmetallic gripping portion of relatively uniform thickness and with an internal diameter substantially greater than that of the shank is then telescoped over the shank and held in concentric spaced relation to the shank by suitable spacers. Thus, as best shown in Figure 2, the shank 3, which is generally cylindrical, is formed in two sections, the forward section 6 being of larger diameter than the rearward section 7 and both sections being substantially smaller in diameter than would be desirable for a satisfactory hand grip.

The shank is further provided with three annular projections 8, 9 and 10 of larger diameter than the shank and adapted to fit the inside diameter of a tubular outside sheath which, in the preferred form of the invention, is made up in three sections by the tubular members 11, 12 and 13. It will be observed that the forward tubular section 11 is held in concentric relation with respect to the shank 3 by engagement with the annular projections 8 and 9, the tubular section 12 is similarly positioned by the projections 9 and 10, and the forward end of the tubular section 13 is positioned by the annular projection 10. The rear end of the tubular section 13 fits over a shoulder 14 formed on an end washer 15. The washer 15 is provided with a central cylindrical recess 16 which fits the rear end of the shank, and a retaining screw 17 which is fitted in a countersunk opening in the washer 15 is threaded into a tapped opening in the end of the shank to hold the washer in position and clamp the three tubular sections 11, 12 and 13 against each other and against a shoulder 18 formed at the base of the shank.

In order to prevent rotation of the outer sheath relative to the shank, the forward section 11 of the sheath is provided with a pair of diametrically opposed notches 19 adapted to receive radial projections 20 formed on the annular projection 8. This prevents rotation of the inner tubular section 11 relative to the shank. The remaining sections may be similarly locked against rotation, but are preferably secured together at their adjoining ends and to the section 11 by a suitable adhesive cement when the sections are assembled in position on the shank. The adhesive cement, coupled with the endwise pressure applied by the washer 15, is effective to prevent rotation of the sections relative to each other.

It is preferred to form the outer sheath in a plurality of sections, in the manner previously described, for the reason that the shorter sections are easier to mold and, in addition, it is possible to produce rear grip portions having varying color designs by employing tubular sections of different colors. Thus if, as is preferred, tubular sheathing sections 11, 12 and 13 are formed of a plastic composition and if each of the sections is manufactured in two different colors, then an assortment of color designs may be readily obtained by different combinations of different colors of the three sections during assembly.

While the outer surface of the nonmetallic sheath may be given any desired form, it will be noted that in the particular form illustrated it is of largest diameter at the rear end, at which point the shank is of smallest diameter. Consequently, there is a substantial saving, not only in weight but in the amount of sheathing material employed, by reason of the large empty space between the shank and the sheath. While in theory, for maximum lightness, the shank would reduce continuously in diameter toward its rear end, the stepped arrangement shown in the drawings provides an inexpensive approximation of the ideal form which is sufficient for all practical purposes.

The annular spacing elements or projections 8, 9 and 10 may either be integral with the shank 3 or separate spacing washers which are pressed into position on the shank. The diameter and location of the spacing elements will depend upon the form of the handle and the number required will depend upon the number of tubular sections and the strength of the tubular sections. Thus, the distance between the spacing elements may be substantial if, as is preferred, the tubular gripping sections are made of a high strength molded plastic, such as "tenite."

The tubular sheath elements, as shown in the drawings, are provided with a plurality of grooves 21 to enhance the gripping action. It will be appreciated that these may be omitted, if desired, or that any desired arrangement of grooves or knurling may be substituted.

While only one form of the invention is shown and described herein, it is apparent that variations in the details of construction may be indulged in without departing from the spirit of the invention or the scope of the appended claim.

What is claimed is:

A rear grip for a fishing rod handle, comprising a rearwardly projecting shank on the handle, a grip surrounding said shank and comprising two molded plastic tubular members positioned in axial alignment, each of said two members being of progressively increasing internal and external diameters from one end to the other, said two members having their smaller ends pointing toward each other, a third plastic tubular member of substantially cylindrical configuration fitted on said shank intermediate said first two members and of an outside diameter equal to the smaller ends of said two members, means for supporting the small ends of said two members in coaxial relation with respect to said shank, the portion of said shank extending forwardly from adjacent the rear end of the forward member for a major portion of the length of the forward member being of substantially smaller diameter than the portion of the forward member which surrounds the same, a shoulder formed at the forward end of the shank and supporting the forward end of the forward member in coaxial relation with respect to the shank, the portion of said shank extending rearwardly from adjacent the forward end of the rearward member being of substantially smaller diameter than the portion of the rearward tubular member which surrounds the same, and a member removably fitted on the shank adapted to engage the inner surface of the rear end of the rearward tubular member and support the same in axial alignment with the shank.

RICHARD A. THOMPSON.
ERIK E. ERIKSSON.
JOSEPH CARLSON.

REFERENCES CITED

The following references are of record in the file of this patent:

UNITED STATES PATENTS

| Number | Name | Date |
| --- | --- | --- |
| 1,628,897 | Mills | May 17, 1927 |
| 1,920,966 | Carlson | Aug. 8, 1933 |
| 2,010,627 | Dileo | Aug. 6, 1935 |
| 2,057,535 | McKechnie | Oct. 13, 1936 |
| 2,424,430 | Beyer | July 22, 1947 |

FOREIGN PATENTS

| Number | Country | Date |
| --- | --- | --- |
| 730,340 | France | May 10, 1932 |